Nov. 11, 1924. 1,515,493
H. D. KELLY
SAW HANDLE
Filed July 12, 1924
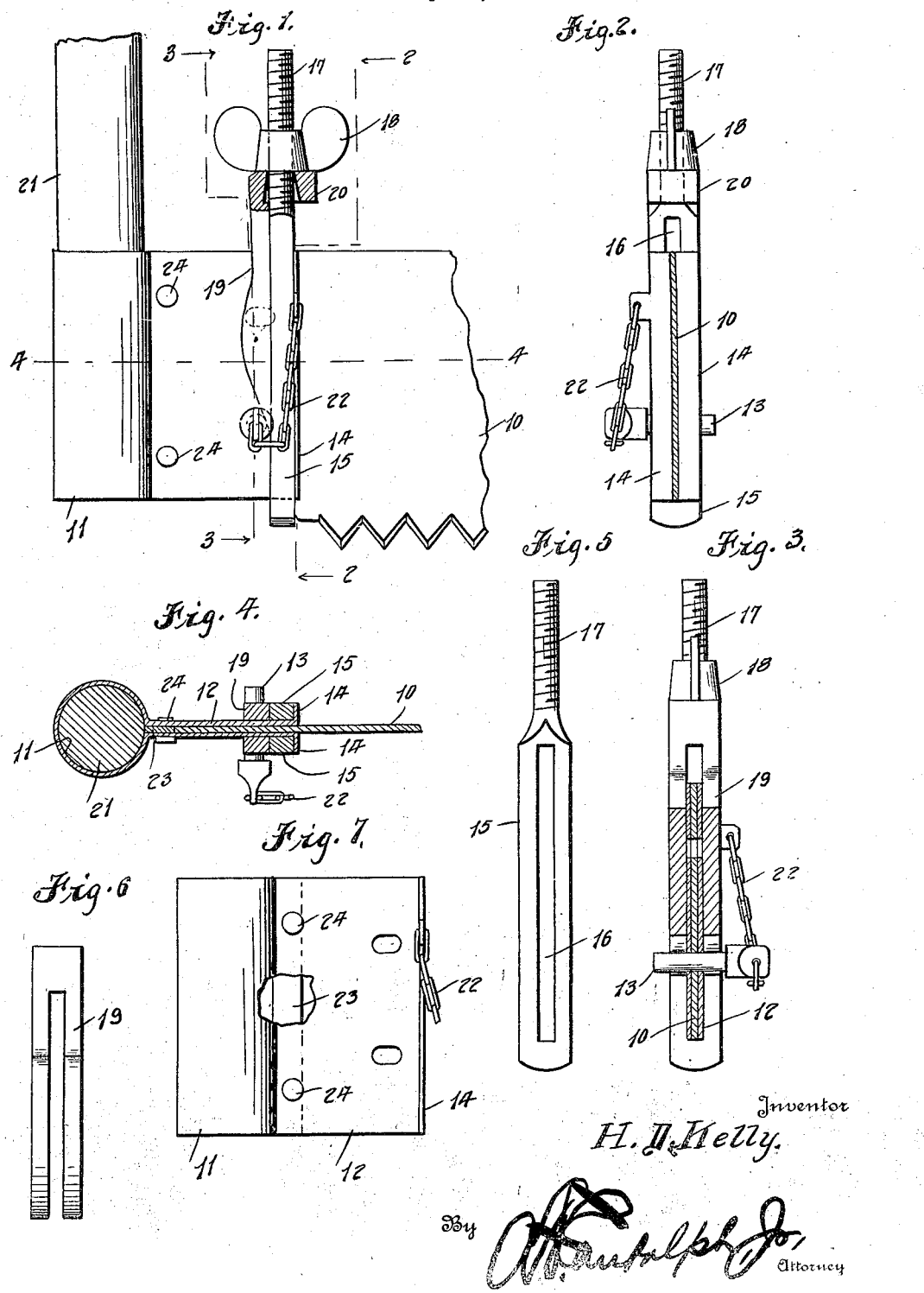

Patented Nov. 11, 1924.

1,515,493

UNITED STATES PATENT OFFICE.

HUGH D. KELLY, OF JUNCTION CITY, LOUISIANA.

SAW HANDLE.

Application filed July 12, 1924. Serial No. 725,564.

*To all whom it may concern:*

Be it known that I, HUGH D. KELLY, a citizen of the United States, residing at Junction City, in the parish of Claiborne and State of Louisiana, have invented certain new and useful Improvements in Saw Handles; and I do hereby declare the following to be a full, clear, and exact description of the invention, such as will enable others skilled in the art to which it appertains to make and use the same.

This invention relates to a handle for cross-cut saws and has for its object the provision of a handle which may be readily detached from and quickly applied to a saw, and which when in position is free from any lost motion and capable of being adjusted to maintain a tight joint at all times whereby to obviate any play between the handle and saw which is objectionable and detracts from the efficiency of the tool.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the spirit of the invention.

Referring to the accompanying drawings forming a part of the invention:

Figure 1 is a side view of a saw handle embodying the invention, showing the same applied and having a portion in section;

Figure 2 is a sectional view on the line 2—2 of Figure 1, looking to the left as designated by the arrows;

Figure 3 is a sectional view on the line 3—3 of Figure 1, looking to the right as denoted by the arrows;

Figure 4 is a horizontal section on the line 4—4 of Figure 1;

Figure 5 is a front view of the yoke;

Figure 6 is a rear view of the wedge; and

Figure 7 is a side view of the holder, a portion being broken away.

Corresponding and like parts are referred to in the following description and designated in the several views of the drawing by like reference characters.

The numeral 10 denotes the blade of a cross-cut saw, the same being shown to demonstrate the application of the invention. The holder comprises a socket 11 and a shank 12, the latter comprising spaced members between which the blade 10 is made secure by means of a pin 13 which passes through registering openings formed in the blade 10 and members comprising the shank 12. The outer ends of the shank members are off-set laterally as indicated at 14 to provide stop shoulders for a yoke 15 which is slotted as indicated at 16 to receive the shank. A threaded stem 17 is provided at the upper end of the yoke 15 and receives a thumb nut 18 which is utilized for advancing the wedge 19 and holding the wedge in the required adjusted position. A head 20 is provided at the upper end of the wedge 19 and is operative to receive the threaded stem 17. The wedge 19 is forked to straddle the shank 12 of the holder and the forked members are adapted to be held between the rear side of the yoke 15 and the projecting ends of the pin 13 thereby forcing the yoke against the stop shoulder 14 to prevent any lost movement between the saw 10 and the holder. A handle 21 is fitted in the socket 11. A short chain 22 connects the pin 13 to the holder to prevent displacement or loss of the pin.

In the preferred construction the holder is formed from a strip of sheet metal which is folded upon itself the portion adjacent the fold being shaped to provide the socket 11 and the end portions being brought close together so as to snugly receive the saw 10 between them. A filler 23 consisting of a metal strip is interposed between the part comprising the shank 12 of the holder and suitable fastenings such as rivets 24 secure the filler 23 and shank members. The yoke 15 and wedge 19 are preferably cast although they may be formed in any preferred way.

What is claimed is:—

1. A handle attachment for a cross-cut saw, the same comprising a holder, a pin associated with the holder, and forming connecting means of the saw therewith, a yoke embracing said holder and restrained from disengagement therewith, a wedge adapted to operate between the yoke and pin and means carried by the yoke for advancing the wedge and holding it in the required adjusted position.

2. A cross-cut saw handle attachment comprising a holder embodying a shank having laterally disposed stops, a pin passing transversely through the shank and forming connecting means between the saw and holder, a yoke mounted upon the shank of the holder and engaging the lateral stops thereof, a wedge co-acting with the yoke and pin, and means mounted upon the yoke for advancing the wedge and holding it in the required adjusted position.

3. A cross-cut saw attachment comprising a holder including a shank having off-standing shoulders, a pin passing through the shank, a yoke mounted upon the shank and having a threaded stem, a wedge comprising spaced portions embracing the shank, and provided at one edge with a head having an aperture through which the threaded stem of the yoke passes, and a nut mounted upon the threaded stem of the yoke to advance the wedge and hold it in the required adjusted position.

4. A saw handle attachment comprising a holder including a socket and shank, the latter having off-set portions, a yoke mounted upon the shank and having a threaded stem at one end, a wedge comprising spaced portions embracing the shank and provided at one end with an apertured head through which the threaded stem of the yoke passes, and a nut mounted upon the threaded stem to advance the wedge and hold the same in the required adjusted position.

In testimony whereof I affix my signature in presence of two witnesses.

HUGH D. KELLY.

Witnesses:
J. F. LEAKE,
V. CAUPIN.